June 24, 1930.　　　A. F. WENDLER　　　1,765,389
FILTER PRESS
Filed May 14, 1926
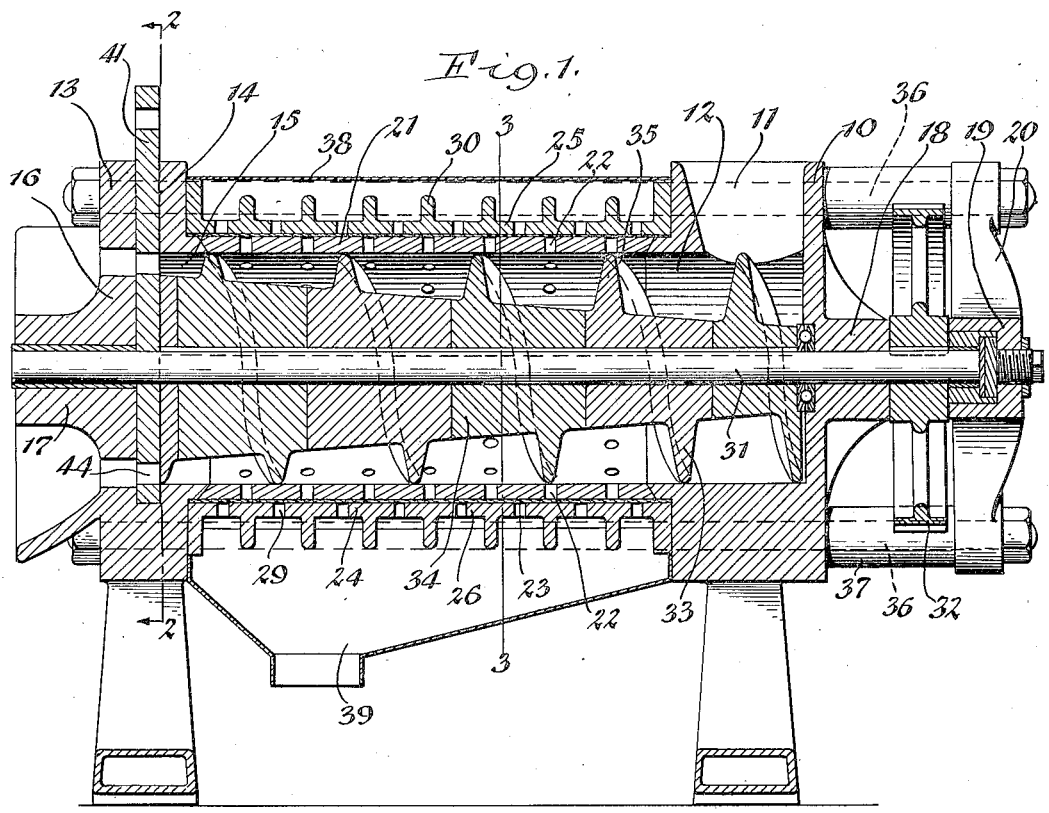
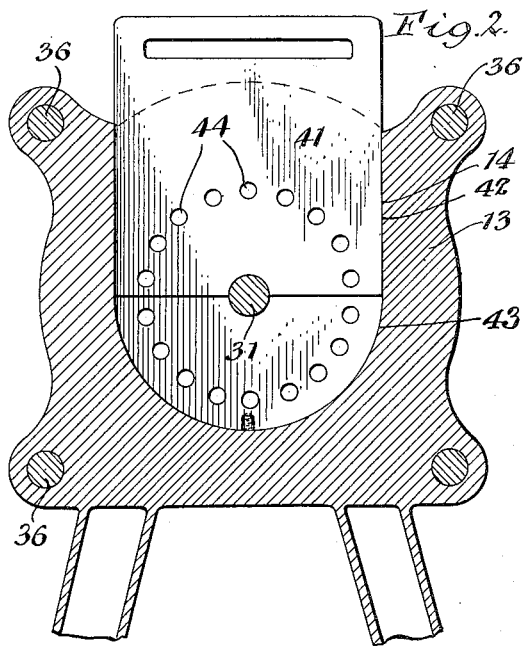
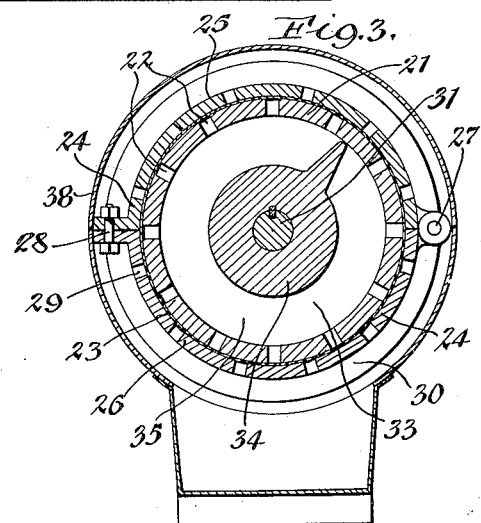
Inventor
A. F. WENDLER
by William J. Narslek
Attorney Patented June 24, 1930

1,765,389

UNITED STATES PATENT OFFICE

ADOLPH F. WENDLER, OF BUFFALO, NEW YORK, ASSIGNOR TO NATIONAL ANILINE & CHEMICAL COMPANY, INCORPORATED, OF NEW YORK, N. Y., A CORPORATION OF NEW YORK

FILTER PRESS

Application filed May 14, 1926. Serial No. 109,069.

This invention relates to filter presses for removing liquid or moisture from pastes and similar substances.

It is well known that mechanical means for the removal of a liquid from admixture with a solid are the most economical in operation; but, when the amount of liquid is small in comparison to the solid content, greater pressure is generally required than is available in a press of the plate or leaf type. Screw presses have been developed in which stock is forced against a shell built of bars to cause exudation of liquid through the cracks left between the bars and thereafter filtering the liquid. Such a press has a continuous action, a large capacity, negligible labor cost, and is unexcelled by other types. However, presses of this character have heretofore been restricted in use to pulpy materials of a nature that can not be forced between the bars and which therefore build up a cake remaining within the press.

According to the present invention screw presses are adapted for pastes generally and their field of usefulness therefore, is largely extended by a construction which permits liquid to flow but prevents the passage of solids, that is, one which filters as well as expels. This is secured by concentric perforated shells with an interposed filtering medium, supported to withstand the high pressures involved by a staggering of the openings in an inner and a contiguous outer shell. The filtering medium is thus maintained in contact about a perforation in the case of an inner shell, by the solid backing of an outer shell, and likewise by an inner shell with respect to a perforation of an outer shell, and by both shells in the span from one perforation to the other. This arrangement causes a flow of filtrate in a stream line or edge direction through the filtering medium, thus securing an extremely high or substantially complete filtration or separation of solids from the liquid in addition to that of expulsion of liquid from the solid. The shells can be cylindrical and the coacting screw can have a thread of uniform diameter formed on a tapered body of a diameter increasing in the direction of the cake discharge, or the shells can be tapered or conical and the screw thread likewise conical on a body of uniform diameter; the pitch of the screw thread can be uniform or non-uniform. In order that the resistance of the passage of the paste can be controlled, as dictated by the nature of the paste, pressure desired, etc., means are provided for regulating the size of the discharge opening.

In the accompanying drawing illustrating an embodiment of the invention,

Fig. 1 is a vertical axial section;

Fig. 2 is a cross section on the line 2—2 of Fig. 1; and

Fig. 3 is a vertical cross section on the line 3—3 of Fig. 1.

The embodiment selected for illustrating the invention comprises an end member or abutment 10 having a hopper 11 and a cylindrical cavity 12 formed therein. A second end member or abutment 13 has a slot 14 and a cylindrical passage 15 which is partly closed by a cross piece 16 supporting a shaft bearing 17. The first end member 10 likewise includes a shaft bearing 18, and a third shaft bearing 19 is supported by a spider 20.

A cylindrical shell 21 is supported between the end members 10 and 13. The shell is preferably integral and provided with perforations 22. A filter cloth 23 or other suitable filtering medium is wrapped about the shell and is clamped thereto by a second shell 24. The shell 24 can be in two semi-cylindrical sections 25 and 26 hinged together at 27 and their free edges secured by bolts 28 to draw the two sections into close contact with the cloth. The outer shell 24 has perforations 29 in staggered relation to those in the inner shell 21, and it is provided with circumferential ribs 30.

A shaft 31 is journaled in the bearings 17, 18 and 19. A gear wheel 32, driven by any suitable means not shown, is splined to the shaft between the bearings 18 and 19, and the shaft portion extending through the shell between the bearings 17 and 18 carries a screw 33. As shown, the screw has a conical body 34, suitably secured to the shaft, on which is formed a thread 35 of a diameter to fit snugly within the inner shell. The pitch may be uniform or variable and the body can be made in sections or in one piece. Tie bars 36 hold the end members in contact with the shell, and the spider is supported in spaced relation to the end member 10 by the tie bars and spacing elements 37. The shell can be enclosed by a casing 38 with which is associated a drip pan 39 to suitably direct the filtrate.

A removable gate 41 is fitted in the slot 14 which is formed in the end member or abutment 13. The gate is made in two sections 42, 43 to fit about the shaft 31 and is provided with a circular row of perforations 44 opening into the annular space between the inner shell 21 and the conical screw body 34. The gate is replaceable by others having perforations of different sizes.

In operation, paste is charged into the hopper 11 and engaged by the screw 33 which forces the paste forward into the shell. The paste is gradually pressed between the shell and the conical body, and it flows through the perforation 22 into contact with the filter cloth. The outer shell supports the cloth, and the filtrate, separated by the cloth, is directed longitudinally to perforations 29. The exuded liquid is collected in the drip pan 39. Sufficient resistance to the onward movement of the cake is obtained by the replaceable gate 41, through the perforations 44 of which the pressed cake is ejected. The operation is accordingly continuous, and the character of the cake or the filtrate can be determined at any time. By this means a large percentage of moisture or other liquid is removed from the paste, and a substantial saving of steam consumption in a subsequent drying operation is secured.

I claim:

1. In a filter press the combination comprising an end abutment member having a bearing, another abutment having a hopper, a cylindrical perforated shell interposed between the two abutments and a rotatable screw journaled in said bearing to feed and compress the material, and a split removable plate slidably mounted in the first mentioned end abutment member and having openings therein for discharging the compressed material.

2. In a filter press, the combination comprising a perforated shell, a filtering medium associated with said shell, means for forcing material to be filtered into contact with said shell, and a sectional removable plate positioned at the outlet of said shell having perforations therein for the passage of a separated filter cake, the said perforations being of restricted size and number to supply requisite resistance to the passage of the cake.

In testimony whereof I affix my signature.

ADOLPH F. WENDLER.